United States Patent [19]

de Paolis

[11] 3,716,372

[45] Feb. 13, 1973

[54] PROCESS FOR MANUFACTURE OF SOY CONCENTRATES, SOY ISOLATES AND RELATED PRODUCTS

[76] Inventor: Potito U. de Paolis, 144-D Camden Drive, Beverly Hills, Calif. 90212

[22] Filed: Nov. 16, 1970

[21] Appl. No.: 89,829

Related U.S. Application Data

[63] Continuation-in-part of Ser. No. 848,516, Aug. 8, 1969, abandoned.

[52] U.S. Cl. ..............................99/17, 99/98, 99/99
[51] Int. Cl. ...............................A23j 1/14, A23l 1/20
[58] Field of Search ...................99/98, 99, 17; 195/4

[56] References Cited

UNITED STATES PATENTS 3,048,492   8/1962   Barton..................................99/98 X Primary Examiner—A. Louis Monacell
Assistant Examiner—William Andrew Simons
Attorney—I. Morley Drucker

[57] ABSTRACT

After destruction of the trypsin inhibitors in dehulled soy bean material (such as meal or flakes) as by boiling or near-boiling, in water, for a short period of time, the resulting solids are rendered almost 100 percent soluble or dispersible in water by introducing from about 0.1 ml. to about 2 ml. of a solution containing the enzyme catalase by weight, each ml. of solution containing 1000 Baker units of the enzyme catalase, to each 100 grams of starting soy bean material and not allowing any hydrogen peroxide to be introduced. The introduction of catalase into the soy bean material is found to produce a soy concentrate and soy isolate having almost 100 percent dispersibility and increased NSI solubility while having greatly improved flavor characteristics.

10 Claims, 4 Drawing Figures

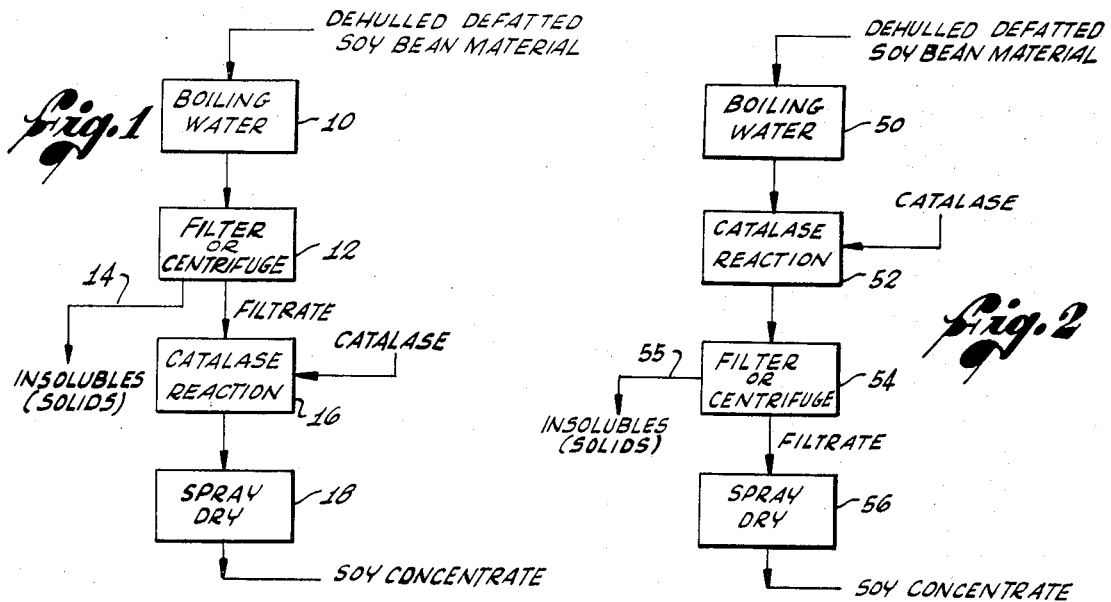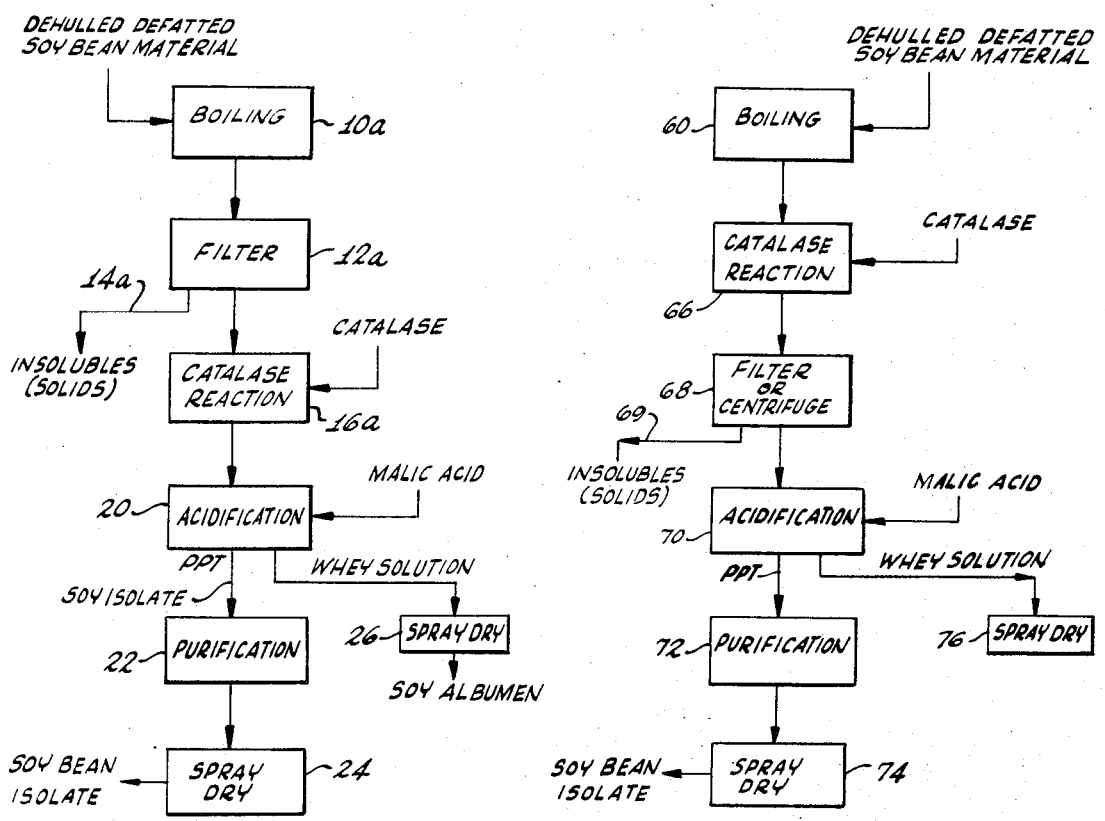

PROCESS FOR MANUFACTURE OF SOY CONCENTRATES, SOY ISOLATES AND RELATED PRODUCTS

CROSS-REFERENCE TO RELATED APPLICATIONS

This application is a continuation-in-part of Ser. No. 848,516, entitled "Process for Manufacture of Soy Concentrates, Soy Isolates and Related Products" and filed on Aug. 8, 1969, now abandoned, inventor Potito U. dePaolis.

BACKGROUND AND OBJECTS OF THE INVENTION

Soy protein, mainly soy cencentrate and soy isolates are sold on the market in great abundance today. Soy concentrate is normally defined as the product prepared from high quality, sound, clean, dehulled soy beans by removing most of the oil and water-soluble nonprotein constituents and shall not contain less than 70 percent protein (Nx6.25)[1] on a moisture-free basis. Soy isolate is a product prepared from defatted, dehulled soy beans and contains not less than 90 percent protein (Nx6.25) on a moisture-free basis. Patents and publications describing processes for production of soy bean products are very numerous. However, I have found that all products obtainable by prior art processes have certain significant disadvantages. The most prevalent problems are lack of water solubility and dispersibility, beany flavor, bitter after-taste, astringency and color.

In some processes solubility of the soy bean protein is improved by partial enzymatic or hydrolytic depolymerization. However, such processes are difficult to control and, additionally, desirable properties exhibited only by the undegraded molecule are simultaneously destroyed. Other patents claim debittering and deflavoring by steam treatment of the soy meal at a low or neutral pH, by washing of the curd at the isoelectric point, by treatment with chemical reagents, such as $H_2O_2$ or $SO_2$, by solvent extraction, etc. These treatments, however, denature and, thus, insolubilize the protein to a considerable extent, and, although some of the procedures are effective in removing the beany flavor, the resulting products retain their bitterness and/or astringency.

It is a major object of the present invention to provide a method of producing soy concentrates and soy isolates having greatly improved dispersibility of substantially 100 percent in water, while, at the same time, improving the flavor characteristics of these products. Additionally, I have found that these advantages brought about by my invention result in the production of a whey solution containing substantial quantities of protein, making it a very valuable animal food source, or cheap source of protein containing food for many industries. Further, I have found that my invention can be employed with advantage, in the processing of full fat dehulled soy beans, i.e., soy beans which have not had the fats or oils extracted therefrom.

SUMMARY OF THE INVENTION

The invention includes the discovery that after destruction of the trypsin inhibitors in defatted, dehulled soy bean material (such as meal or flakes) as by boiling or near-boiling, in water, for a short period of time, the resulting solids are rendered almost 100 percent soluble or dispersible in water by introducing from about 0.1 ml. to about 2. ml. of a solution containing the enzyme catalase by weight, each ml. of solution containing 1000 Baker units [II] of the enzyme catalase, to each 100 grams of starting soy bean material. The introduction of catalase into the soy bean material is found to produce a soy concentrate and soy isolate having almost 100 percent dispersibility and increased NSI solubility [III] while having greatly improved flavor characteristics with respect to the prior art.

The use of catalase with full fat soy bean material is found to produce a soy protein product which while not classifiable as a soy concentrate, because of the fat content, nevertheless has greatly improved flavor characteristics.

The use of a catalase plus a bleaching agent such as sodium peroxide is found to result in degradation of protein, and lack of solubility and dispersibility in the resulting soy concentrate and isolates.

It is well known that the treatment of soy bean material by peroxides results in serious denaturation. It is believed that the reason for the remarkable success of the use of catalase alone is as follows: certain peroxides, which may be formed during normal processing of defatted or full fat soy meal or soy flakes cause significant denaturation of the soy protein. By reacting catalase with the soy protein material early in the processing sequence, and before spray-drying at temperatures of between 70°F and 100°F or higher, any peroxides formed will be decomposed to water and oxygen. It will be seen, therefore, that the introduction of peroxides is to be avoided.

BRIEF DESCRIPTION OF THE DRAWINGS

FIGS. 1 and 2 are schematic representation of two different embodiments of the method of my invention for making soy protein products from dehulled soy bean material; and FIGS. 3 and 4 are schematic representation of two different embodiments of the method of my invention for making soy isolates and "soy albumen" from defatted, dehulled, soy bean material.

DETAILED DESCRIPTION

The usual starting material in my process for making any of the soy concentrate, soy isolate and soy albumen material is defatted, dehulled soy bean flakes or meal. The soy bean materials are dehulled and defatted by conventional methods and result in a material normally having between about 45–50 percent protein, 30–35 percent carbohydrates and 0.5–4 percent fats, 5–15 percent ash and fiber and the remainder moisture. Defatting of the soy beans is normally accomplished by extraction with hexane. Residual fat is less than 1 percent.

Also, it will be understood that if the dehulled soy bean flakes or meal are not defatted, there will be present an additional 16–20 percent fat content in the starting soy material. . I will describe the process with reference to a starting material of defatted and dehulled soy bean flakes, it being understood that the processing is the same for full fat flakes or meal. The end product, in this case, will not be classifiable as a soy concentrate, because of the 20 percent fat present.

However, it will be a more flavorful soy protein product.

The starting defatted and dehulled soy bean material for making soy concentrates is then immersed in boiling or near-boiling water (175°–212°F) for 20–35 minutes (Step 10 of FIG. 1). The pH of the water is held close to 7. Under these conditions, the trypsin inhibitor in the soy bean material is destroyed while very little denaturation of the soy protein occurs. Further, the off-flavor-potentiating materials are, to a great extent, destroyed.

The boiled material may then be filtered or centrifuged (Step 12 of FIG. 1) and any insolubles containing small amounts of denatured protein, ash, fiber and other insolubles are discarded, or perhaps sent to other processing steps (Step 14 of FIG. 1).

The filtrate, containing all of the soluble protein, has added to it from about 0.1 ml. to 2 ml. of a solution of the enzyme catalase, (each ml. of solution containing 1000 Baker units of the enzyme catalase) per 100 grams of starting defatted dehulled soy bean material. It is believed that some hydrogen peroxide is produced during the boiling phase of the process. In order to minimize the deleterious effect of the peroxide, catalase is introduced into the filtrate as the filtrate is reduced in temperature to about 150°F for less. If the catalase is introduced when the filtrate temperature is above 150°F, the catalase will be ineffective. The optimum range of filtrate temperature, for introduction of the catalase, lies between about 120°–140°F. The reaction is allowed to proceed for a period of between 1 and 15 minutes (Step 16). The catalase may be derived from animal, plant, bacterial or fungal sources. It is presently preferred to use catalase derived from a plant source. FERMACOLASE, a concentrated red-amber aqueous preparation of the enzyme catalase, standardized at 1000 Baker units of catalase per ml., is an example of catalase employed, (from Fermco Laboratories, Division of G. D. Searle & Co., Chicago, Ill. 60680).

In order to produce soy concentrates (protein content of about 70 percent, dry basis) the filtrate from the catalase reaction need then only be spray-dried (Step 18). The resulting concentrate is characterized by having nearly 100 percent dispersibility in water (when 5 percent of the concentrate by weight, is added to water) 100 percent NSI solubility, and very little off-flavor.

Alternatively, and referring now to FIG. 2, the soy bean material can be sent from the boiling step 50 directly to the catalase reaction step 52, without filtration of insolubles. In this way, catalase is allowed to react with the insoluble as well as the soluble parts of the soy bean material. After the catalase reaction step 52, the insolubles are filtered out or centrifuged (Step 54) and sent to further treatment, via line 55. The filtrate is spray-dried, as before (Step 56) to produce a soy concentrate having the same properties as the soy concentrate produced in accordance with FIG. 1.

In the further treatment of insolubles, it appears that this material, after the catalase reaction, has a much better flavor, than if it had not been reacted with the catalase.

The soy concentrate made by the method of FIGS. 1 of my invention was compared with the same processing techniques, but utilizing small amounts of peroxides plus catalase, instead of catalase alone, and was compared also with the best products found in the market place (Products X and Y). The results are set forth below:

TABLE I

| Process | Bitterness | Chalkiness | Beaniness | Astringency | Solubility NSI | Dispersibility |
|---|---|---|---|---|---|---|
| a) catalase only | none | none | some | none | 100% | 100% |
| b) catalase + peroxide | none | distinct | v. strong | some | 100% | 70% |
| c) Product X | none | strong | some | none | 55.1% | 81% |
| d) Product Y | none | strong | strong | none | 5.3% | 49% |

In order to prepare soy isolates, by the method of this invention, the same processing steps, as described for the making of soy concentrates, are followed, up to and including the catalase reaction step. The same reference numerals, followed by a small a are therefore placed on the flow sheet of FIG. 3.

After the catalase reaction step, the filtrate is acidified (Step 20) to a pH of 4.5 (the isoelectric point of the soy protein), preferably with malic acid, and the soy protein is precipitated.

The precipitate is then recovered and purified (Step 22). Purification usually consists of washing with water and then neutralizing with sodium hydroxide. The pH is adjusted to near neutral. The washed and neutralized soy protein is then spray-dried (Step 24), and because the resulting dried product contains over 90 percent protein, it is by definition a soy isolate.

The soy isolate produced by my method, was compared with processing by means of catalase and peroxides and also compared with the best products on the market, in terms of dispersibility, NSI solubility, and flavor. The results are tabulated below:

TABLE II

| Process | Bitterness | Chalkiness | Beaniness | Astringency | Solubility NSI | Dispersibility |
|---|---|---|---|---|---|---|
| a) catalase only | none to slight | none | some | none to slight | 50% | 100% |
| b) catalase + peroxide | some | distinct | none | some | 31.4% | 70% |
| c) Product U | none | moderate to strong | moderate | none to slight | 25.7% | 95% |
| d) Product U | slight | moderate | none to slight | slight | 25.8% | 100% |

The residual solution remaining after precipitation of the soy protein in the acidification step is known as the "whey solution". They whey contains mostly polysaccharides but perhaps as much as 20 percent proteins. Because it contains soy protein, it is sometimes referred to as a soy albumen. The whey solution is spray-dried (Step 26) and a dry soy albumen is produced.

The soy albumen prepared by my process was compared with the best available product on the market and was found to have better flavor characteristics, i.e., less bitter and less astringent, while being 100 percent dispersible and having a NSI solubility of 100 percent when put in a 5 percent aqueous solution. The best available product, which had flavor deficiencies, was 93 percent dispersible — having an NSI solubility of 89.8 percent, in a 5 percent aqueous solution.

Referring now to FIG. 4, the process flow is substantially the same as that described with reference to FIG. 3 from the point of acidification (Step 70) onwards to completion via purification Step 72 and spray-drying Steps 74 and 76. Prior to the acidification, the catalase reaction is allowed to take place in the presence of insoluble, as well as soluble materials, i.e., after boiling (Step 60) or near-boiling, the starting material is reacted with catalase (Step 66) and only then is it filtered and centrifuged (Step 68). The insolubles are taken away, via line 69, and are blander, more pleasant, tasting because of the catalase reaction and is considered a more useful product than if it had not been reacted with catalase.

Examples of my process are set forth below:

Example 1 (following FIG. 1)

100 grams of defatted untoasted soy bean flakes were extracted with 1000 ml. of water at a temperature of 194°F for 25 minutes. The pH was 7. The mixture was centrifuged and the residue extracted with an additional 1000 ml. of water. The extracts were combined, and when the temperature dropped to 125°F, 1.0 ml. of FERMCOLASE (1000 Baker units/ml.) was added. After 10 minutes, the extract was spray-dried. The resulting soy concentrate had the properties noted in Table I (a) above.

Examples 2 and 3

The process steps of Example 1 were followed exactly but the starting material were (1) soy bean meal and (2) full fat soy bean flakes. The reaction with catalase was allowed to proceed for 15 minutes before spray-drying commenced.

Example 4

The process of Example 1 was followed exactly except that 0.1 ml. of FERMCOLASE was employed. The results were comparable to those set forth in Table I (a) above except that the flavor characteristics were not as pleasing.

Example 5 (following FIG. 2)

100 grams of defatted untoasted soy bean flakes were extracted with 1000 ml. of water at a temperature of 194°F for 25 minutes. The pH was 7. The mixture was cooled to 125°F and then 1.0 ml. of FERMCOLASE (1000 Baker units/ml.) was added. After 10 minutes, the mixture was filtered. The filtrate was spray-dried and the product resulting soy concentrates, had the properties noted in Table I (a) above.

Example 6

In this example, a soy isolate and soy albumen were prepared from soy bean flakes. The initial steps of the process are the same as those set forth in Examples 1 or 5 except that after the catalase reaction (FERMCOLASE) for the requisite amount of time and/or filtration, the pH is adjusted to 4.5 by the addition of a 10N solution of malic acid. This solution is then centrifuged. The supernatant liquid is replaced with an equal volume of water and centrifuged again.

The filtrate is removed and the residual precipitate material is washed. The pH of the precipitate is then adjusted to about 7–8 by the addition of a base such as sodium hydroxide and is then spray-dried. The properties of the resulting isolate material are set forth in Table II (a).

The filtrate is then spray-dried and the solids left are termed soy albumen. The properties of the soy albumen, so prepared, are substantially equal to those previously set forth.

I claim:

1. In a process for treating dehulled soybean material, the improvement which comprises: immersing said soy bean material in hot water at a temperature of between 175° F and 212° F for a period of from 20–35 minutes; adding to said hot water, containing soy bean material, as it cools to between about 120° F and 140° F, about 0.1 to 2 ml. of a solution of catalase, for every 100 grams of said soy bean material, each ml. of solution of said catalase containing 1000 Baker units, said catalase being added without the addition of hydrogen peroxide; allowing said catalase to react for from about 1–15 minutes to form a catalase-reacted aqueous media; and spray-drying said catalase-reacted aqueous media to form a soy protein product.

2. The process of claim 1 wherein insoluble material is separated from said hot water, containing soy bean material prior to the addition of catalase.

3. The process of claim 1 wherein insoluble material is separated from said hot water, containing soy bean material after the catalase reaction has terminated but before the spray-drying of said soy bean containing solution.

4. The process of claim 1 wherein said starting soy bean material is defatted prior to its immersion in hot water.

5. In a process for treating dehulled soy bean material, the improvement which comprises: immersing said soy bean material in hot water at a temperature of between 175° F and 212° F for a period of from 20–25 minutes; adding, to said hot water, containing soy bean material, as it cools to between about 120° F and 140° F, about 0.1 to 2 ml. of a solution of catalase, for every 100 grams of said soy bean material, each ml. of solution of said catalase containing 1000 Baker units, said catalase being added without the addition of hydrogen peroxide; allowing said catalase to react for from about 1–15 minutes; acidifying said water, containing soy bean material, to a pH of about 4.5 to cause soy protein to be precipitated from the acidified aqueous media; filtering said acidified aqueous media to thereby produce a whey solution and a precipitate consisting essentially of soy protein; neutralizing said precipitate; and spray-drying said precipitate.

6. The process of claim 5 wherein said soy bean material is defatted prior to immersion in hot water.

7. The process of claim 5 wherein insoluble material is separated from said hot water after immersion of soy bean material in said hot water, and prior to the addition of catalase.

8. The process of claim 5 wherein insoluble material is separated from said hot water containing soy bean material, after reaction with catalase is terminated but before acidification thereof.

9. In the process of claim 5, spray-drying said whey solution to thereby produce a soy albumen.

10. In the process of claim 5, acidifying said water, containing soy bean material with malic acid.

* * * * *